(12) United States Patent
Moir et al.

(10) Patent No.: US 10,171,650 B2
(45) Date of Patent: *Jan. 1, 2019

(54) ANTI-DISTRACTED DRIVING SYSTEMS AND METHODS

(71) Applicant: 1943596 ALBERTA LTD., Calgary (CA)

(72) Inventors: David Moir, Calgary (CA); Lanny Westgard, Saskatoon (CA); Phil Laplante, Sherwood Park (CA); Glen Suitor, North Vancouver (CA); Dean Lorenson, Calgary (CA)

(73) Assignee: 1943596 ALBERTA LTD., Calgary (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/784,053

(22) Filed: Oct. 13, 2017

(65) Prior Publication Data

US 2018/0041630 A1 Feb. 8, 2018

Related U.S. Application Data

(63) Continuation of application No. 15/097,139, filed on Apr. 12, 2016, now Pat. No. 9,819,789.

(Continued)

(51) Int. Cl.
*H04W 24/00* (2009.01)
*H04M 1/725* (2006.01)
(Continued)

(52) U.S. Cl.
CPC ...... *H04M 1/72577* (2013.01); *H04B 5/0031* (2013.01); *H04W 4/025* (2013.01);
(Continued)

(58) Field of Classification Search
CPC ......... H04W 64/00; H04W 4/02; H04W 4/12; H04W 4/14; H04W 88/02; H04W 88/06; H04W 88/184; H04W 76/02; H04W 92/02

(Continued)

(56) References Cited

U.S. PATENT DOCUMENTS

2013/0035117 A1 2/2013 Litkouhi et al.
2015/0168175 A1* 6/2015 Abramson ............. G01C 21/34
701/408

(Continued)

FOREIGN PATENT DOCUMENTS

WO 2014/072935 A1 5/2014

*Primary Examiner* — Temica M Beamer
(74) *Attorney, Agent, or Firm* — Norton Rose Fulbright Canada LLP

(57) ABSTRACT

An anti-distracted driving system comprises a plurality of transceivers at different locations within a vehicle. Each of the transceivers is operable to receive a signal from a mobile communication device and to output a detection signal indicative of the strength of the received signal. A controller in communication with the transceivers is operable to calculate a corresponding distance of the mobile communication device for each of the detection signals and to determine a location of the mobile communication device within the vehicle based on the distances. The controller can send a signal from a transceiver to a mobile communication device in response to determining that the mobile communication device is near a driver's seat, the signal causing at least one function of the mobile communication device to be inhibited.

16 Claims, 10 Drawing Sheets

Related U.S. Application Data

(60) Provisional application No. 62/281,941, filed on Jan. 22, 2016.

(51) Int. Cl.
| | |
|---|---|
| *H04B 5/00* | (2006.01) |
| *H04W 4/02* | (2018.01) |
| *H04W 4/14* | (2009.01) |
| *H04W 24/08* | (2009.01) |
| *H04W 4/80* | (2018.01) |
| *H04M 1/60* | (2006.01) |

(52) U.S. Cl.
CPC .............. *H04W 4/14* (2013.01); *H04W 4/80* (2018.02); *H04W 24/08* (2013.01); *H04M 1/6075* (2013.01)

(58) Field of Classification Search
USPC .......................... 455/456.1, 466, 565, 422.1
See application file for complete search history.

(56) References Cited

U.S. PATENT DOCUMENTS

2016/0180677 A1* 6/2016 Reed ................. H04W 4/12
340/576
2016/0227021 A1* 8/2016 Tadayon ................. H04M 3/53

\* cited by examiner

ANTI-DISTRACTED DRIVING SYSTEMS AND METHODS

CROSS-REFERENCE TO RELATED APPLICATIONS

This application is a continuation of U.S. patent application Ser. No. 15/097,139, which claims priority from U.S. provisional patent application No. 62/281,941, filed Jan. 22, 2016, the entire contents of which are incorporated herein by reference.

FIELD

This relates generally controlling the operation of mobile devices and, in particular, to systems and methods for deactivating functions of mobile devices in vehicles.

BACKGROUND

Modern mobile telecommunications devices are capable of myriad functions. Smartphones and tablet computers can be used, for example, to browse the internet, play media, send and receive telephone calls, and send and receive messages including short message service (SMS), email and data messages.

Mobile devices are often used by operators of vehicles. Use of certain functions while driving, such as text communication or input, media playback, or the like, may be dangerous and may violate distracted driving legislation in some jurisdictions.

Accordingly, there is a need for systems and methods for controlling operation of mobile devices in vehicles.

SUMMARY

Disclosed herein is an anti-distracted driving system, comprising: a plurality of transceivers at different locations within a vehicle, each of the transceivers operable to receive a signal emitted from a mobile communication device in accordance with a wireless communication protocol and to output a detection signal indicative of the strength of the received signal; a controller in communication with the transceivers to receive the detection signals, the controller operable to calculate a corresponding distance of the mobile communication device for each of the detection signals and to determine a location of the mobile communication device within the vehicle based on the distances; the controller further operable to send a signal from a transceiver to a mobile communication device according to a wireless communication protocol in response to determining that the mobile communication device is less than a threshold distance from a driver's seat, the signal causing at least one function of the mobile communication device to be inhibited.

Also disclosed herein is a mobile communication device, comprising: a processor; a memory storing software applications; a wireless communication radio, the wireless communication radio operable under control of the processor to receive an interrogation signal and to emit a response signal, and to receive a disabling signal; wherein the software applications include an application operable to cause the processor, in response to receiving a disabling signal, to inhibit a function of the mobile communication device.

DESCRIPTION OF THE FIGURES

In the figures, which illustrate example embodiments.

DETAILED DESCRIPTION

Figure 1:
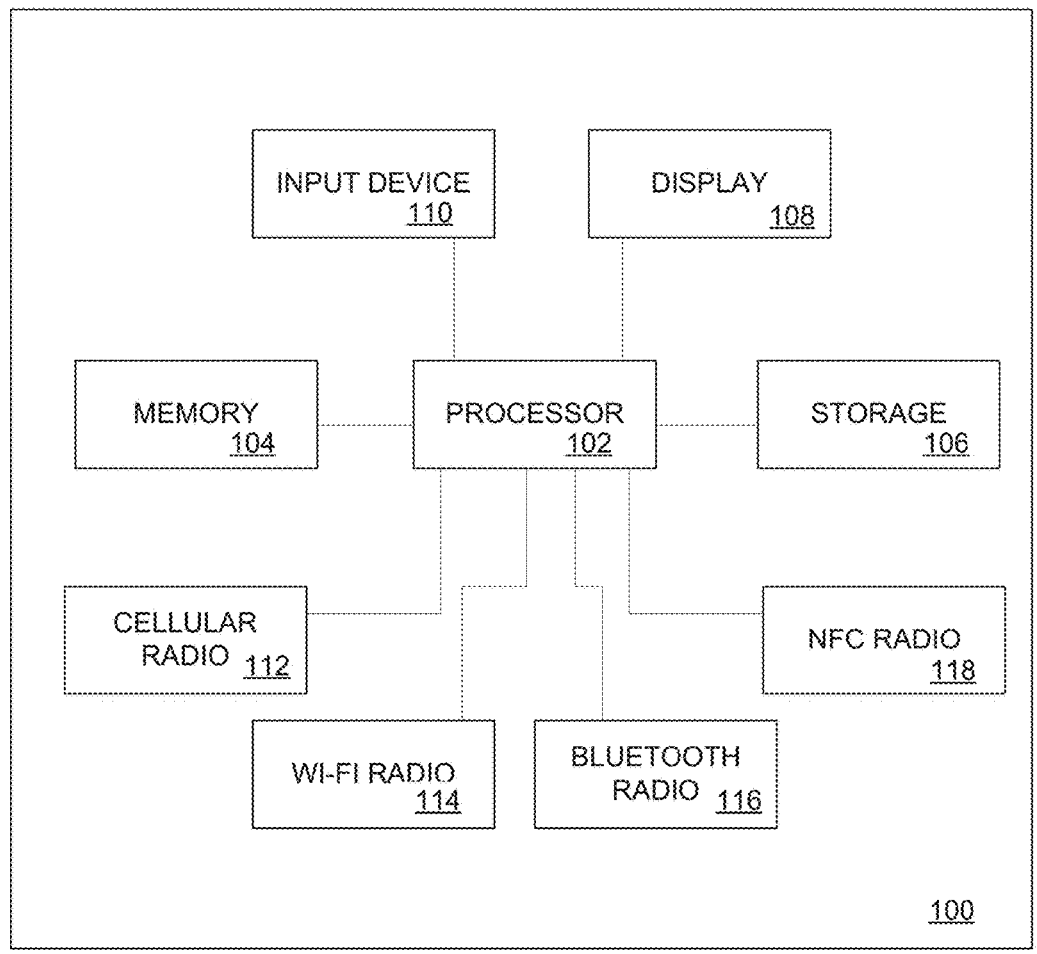
FIG. 1 is a schematic diagram of a mobile communication device.

FIG. 1 depicts a schematic diagram of an example mobile communication device 100. As depicted, mobile communication device 100 is a smartphone.

Mobile device 100 includes a processor 102. Processor 102 may be an Intel™ x86 processor, ARM™ processor or the like. Processor 102 is interconnected with a memory 104 and persistent storage 106. Processor 102 is further interconnected with one or more display devices 108 and one or more input devices 110, such as a touch-sensitive panel, keyboard or the like.

Processor 102 may further be interconnected with a plurality of communications radios. For example, mobile communication device 100 may have at least one cellular radio 112 for voice or data communications on a wireless network. Processor 102 may also be interconnected with a WI-FI radio 114, a bluetooth radio 116 and a near-field communication (NFC) radio 118.

Cellular radio 110 may be operable, for example, interface mobile communication device 100 to a 2G/3G/4G/LTE GSM or CDMA cellular network. WI-FI radio 114 may be operable to wirelessly interface mobile communication device 100 to a local-area network, for example, using IEEE 802.11a/b/g/n/ac standards. Bluetooth radio 116 may be operable to interface mobile communication device 100 with neighboring bluetooth devices according to a bluetooth protocol. NFC radio 118 may be operable to behave in any of a plurality of standard NFC protocols. NFC radio 118 may be capable of operating in a plurality of different modes, including NFC card emulation modes, NFC reader/writer modes and NFC peer-to-peer modes. One or more of cellular radio 110, wi-fi radio 114, bluetooth radio 116 and NFC radio 118 may be capable of receiving signals according to corresponding wireless communication protocols and reporting an associated signal strength.

In some embodiments, one or more components of mobile communication device 102 may be formed as portions of a single semiconductor die, referred to as a "system-on-chip". Alternatively, components may be formed as separate semiconductor dies, in communication through one or more buses on a circuit board.

Figure 2:
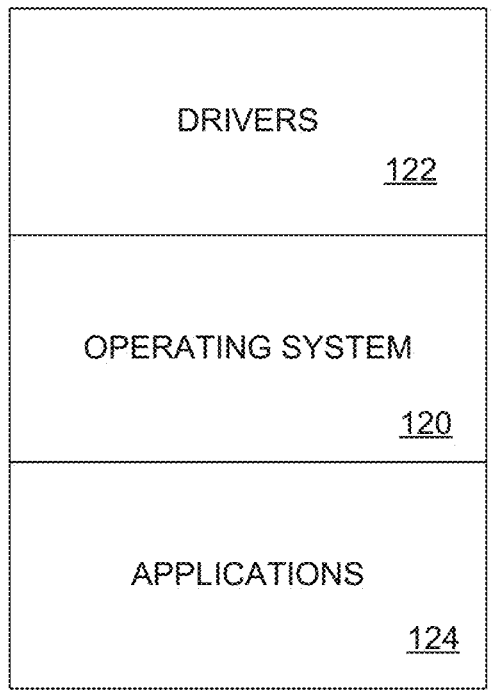
FIG. 2 is a block diagram showing software applications at the mobile communication device of FIG. 1.

Mobile device 100 may operate under control of software stored on storage 106 and executed by processor 102. FIG. 2 depicts example software components.

Software components may include an operating system 120, such as Apple™ iOS™, Android™, Microsoft™ Windows™, Linux or the like. Operating system 120 may interface with hardware components of mobile communication device 100 by way of drivers 122. A plurality of applications 124 may run within operating software 120. Operating system 120 may provide applications 124 with access to low-level (e.g. hardware) functions of mobile communication device 100 by way of application programming interfaces (APIs).

By way of example, applications 124 may include a phone dialer, an email client, an internet browser, messaging applications, social media applications, media players, and the like. Applications 124 may further include one or more settings applications for controlling functions of mobile communication device 120. The settings applications may, for example, toggle components such as cellular radio 110, WI-Fi radio 112, Bluetooth radio 114 and NFC radio 116 ON or OFF. The settings applications may further enable or disable other applications from running, or enable or disable specific files or file types from being opened.

The settings applications may be operable in response to user input, for example, touching a button or screen, or to an event such as a received message, data transmission, signal or the like. Settings may therefore be altered in response to a transmission received on any of cellular radio 112, WI-Fi radio 114, bluetooth radio 116 or NFC radio 118.

In an embodiment, applications 124 may include a driving mode application 124a. Driving mode application 124a may be operable to receive signals from a radio such as NFC radio 118 bluetooth, radio 116, Wi-Fi radio 114 or cellular radio 112. Driving mode application 124a may also be operable to access and change settings of other applications 124 or of operating system 120. For example, as described in further detail hereinafter, driving mode application 124a may be operable to receive a signal from NFC radio 118 indicating that a driving mode should be invoked. In response to the received signal, driving mode application 124a may disable functions of mobile communication device 100 or of applications 124 on mobile communication device 100.

When a driving mode is active, driving mode application 124a may, for example, partially or fully disable one or more radios of mobile communication device 100. For example, driving mode application 124a may place cellular radio 112 in a mode that inhibits sending or receiving of data or text transmissions, and may inhibit sending or receiving of cellular calls unless such calls are routed through a hands-free device such as a bluetooth headset. Alternatively or additionally, driving mode application 124a may disable cellular radio 112 entirely.

Alternatively or additionally, driving mode application 124a may inhibit launching of specific applications, such as web browsers, media players, social media applications, email, and messaging applications.

Alternatively or additionally, driving mode application 124a may disable certain input modes of mobile communication device 100. For example, driving mode application 124a may disable keyboard or touchscreen input, or may disable one or more buttons on mobile communication device 100.

Optionally, driving mode application 124a may convert disabled functions into non-distracting alternative forms. For example, driving mode application 124a may read text-based messages such as short message service (SMS) or email messages using a text-to-voice engine. Alternatively or additionally, driving mode application 124a may receive voice inputs and may process such inputs using a voice-to-text engine.

In some embodiments, driving mode application 124a or functions thereof may be incorporated into operating system 120 of mobile device 100. In other embodiments, driving mode application may be given elevated permissions on installation or at runtime, such as read/write/execute access to a root directory of persistent storage 106.

Figure 3:
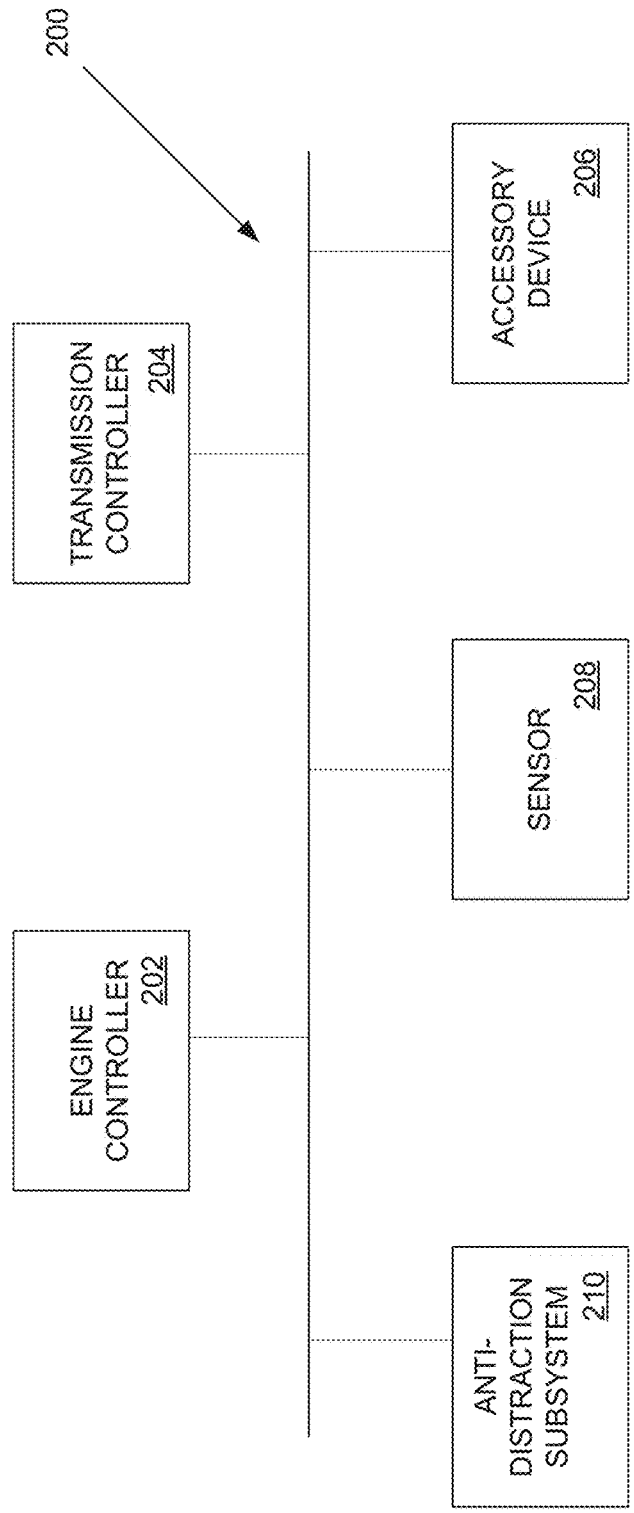
FIG. 3 is a schematic diagram of components of a vehicle computer system.

FIG. 3 depicts a simplified schematic view of a vehicle computer system 200. Vehicle computer system 200 may include an engine controller 202, a transmission controller 204, one or more accessory devices 206, one or more sensors 208 and an anti-distraction subsystem 210. Components of vehicle computer system 200 may be in communication over a network 212 such as a controller area network (CAN) bus.

Engine controller 202 may be operable to control, measure and report engine conditions to other components of vehicle computer 200. For example, engine controller 200 may notify other components of engine RPM, throttle position, load, and the like.

Transmission controller 204 may be operable to control, measure and report transmission conditions to other components of vehicle computer 200. For example, transmission controller 204 may notify other components of vehicle computer 200 of gear selected, transmission speed, temperature and load, and the like.

Accessory devices 206 may be, for example, radios, navigation systems, climate control systems and the like.

Sensors 204 may vehicle condition sensors such as air or fuel flow meters, speed sensors, tire pressure sensors, temperature sensors and the like.

As described in further detail below, anti-distraction subsystem 210 may be configured to receive signals from one or more of engine controller 202, transmission controller 204, accessories 206 and sensors 208 and, based on the received signals, send a signal to a mobile device to cause deactivation of features.

Figure 4:
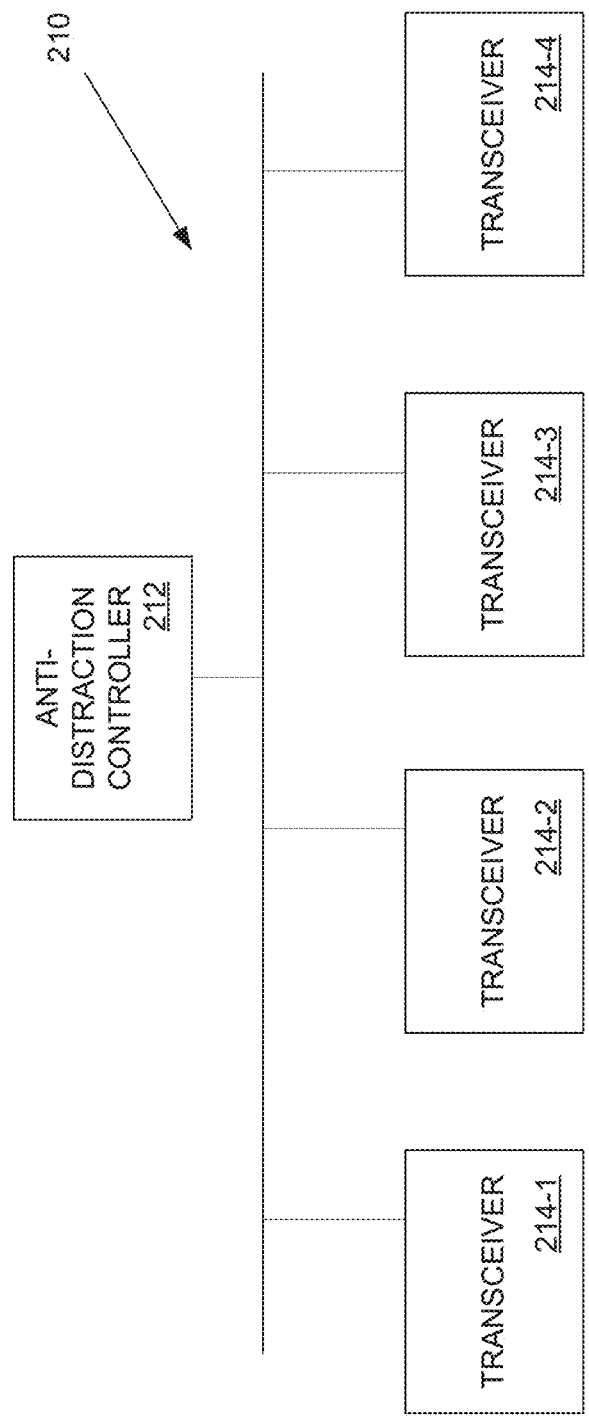
FIG. 4 is a schematic diagram of an anti-distracted driving subsystem of the computer system of FIG. 3.

FIG. 4 depicts components of anti-distraction subsystem 210. Anti-distraction subsystem 210 includes an anti-distraction controller 212 in communication with a plurality of transceivers 214. As depicted, anti-distraction subsystem includes four transceivers 214-1, 214-2, 214-3, 214-4. Other embodiments may have different numbers of transceivers.

Each of transceivers 214 may be operable to send and receive signals according to a wireless communication protocol, such as a cellular, wi-fi, bluetooth or NFC protocol. Transceivers may be configured to send interrogation signals to nearby devices, which may reply with response signals. Transceivers 214 may be configured to report the signal strength of the received response signal. As will be apparent, the strength of the received signal may be dependent on the distance of the receiving device from the transceiver 214. Transceivers 214 may be configured to report received signal strength to anti-distraction controller 212. In some embodiments, transceivers 214 may be able to send and receive signals through a range of at least 3-4 feet. In some embodiments, the range of transceivers 214 may be much greater.

In an example, transceivers 214 may be NFC transceivers. NFC transceivers may read signals from nearby NFC devices by sending an interrogation signal. In response, any nearby NFC devices will send a response signal, the form of which may depend on the mode of the responding device. For example, passive NFC devices such as NFC tags or cards may be excited by the interrogation signal and emit a response signal. Active NFC devices may receive the interrogation signal and actively transmit a response signal.

In other embodiments, transceivers 214 may be wi-fi, bluetooth cellular, or other appropriate wireless transceivers and may send and receive signals according to an appropriate wireless protocol for communication with mobile devices using a corresponding mobile device radio.

Figure 5A:
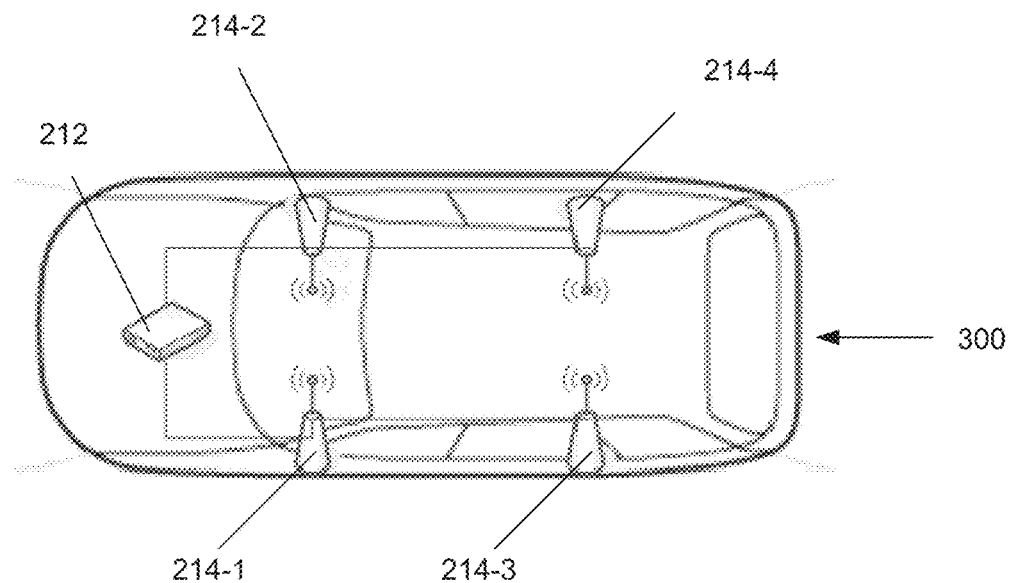
FIGS. 5a-5b are top and side elevation views, respectively, of a vehicle showing components of the anti-distracted driving subsystem of FIG. 4.
Figure 5B:
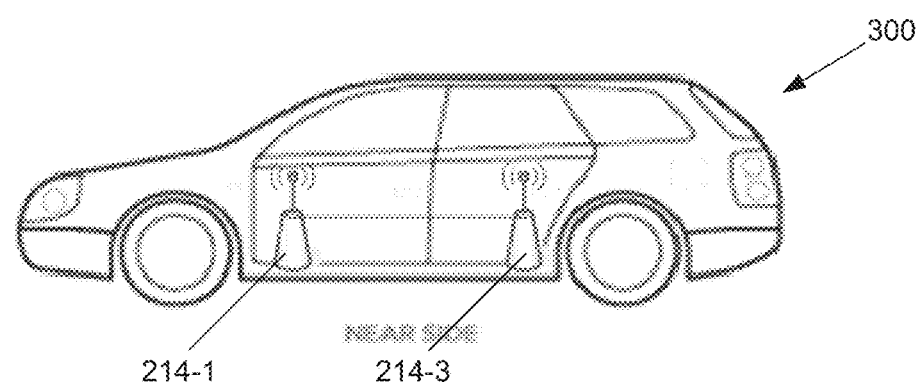

FIGS. 5A-5B depict top and side views, respectively, of a vehicle 300 with anti-distraction subsystem 210. Transceivers 214-1, 214-2, 214-3, 214-4 (individually and collectively, transceivers 214) are located at differing locations around the passenger cabin. As depicted, transceiver 214-1 is located in the front driver's side of the cabin; transceiver 214-2 is located in the front passenger side; transceiver 214-3 is located in the rear driver's side and transceiver 214-4 is located in the rear passenger side. In some embodiments, transceivers 214 may be mounted inside respective structural pillars of the vehicle cabin. Transceivers 214 may be mounted, for example, between panels of vehicle 300 and upholstery (e.g. the headliner) of vehicle 300. Transceivers 214 are mounted so that metallic members of vehicle 300 do not interfere with sending and receiving signals.

Transceivers 214 may detect a mobile device 100 in vehicle 300 by sending interrogation signals and receiving response signals. Each of transceivers 214 may provide a signal to anti-distraction controller 212 indicative of the strength of the received signal.

Anti-distraction controller 212 is configured to triangulate the approximate location of mobile device 100 based on the signals received from the transceivers 214.

Figure 7:
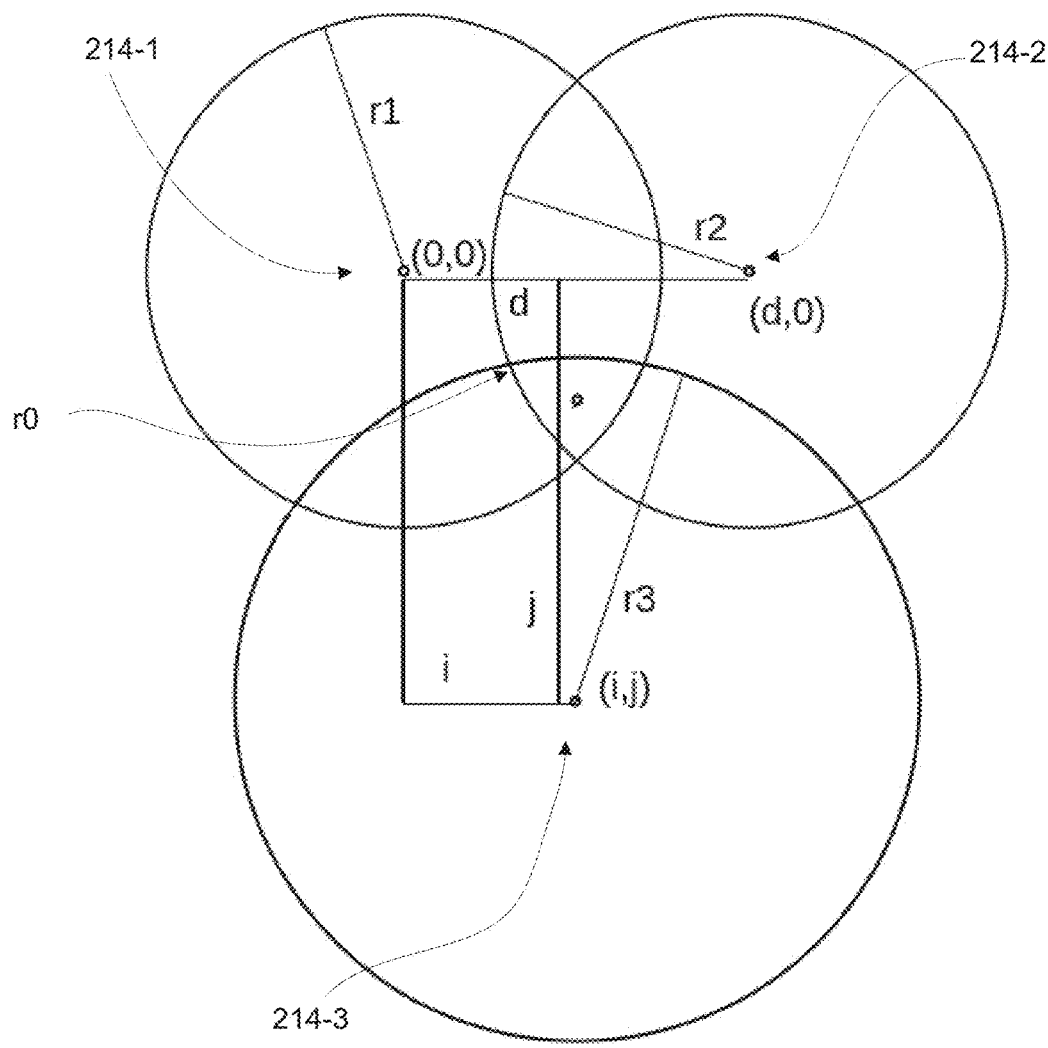
FIG. 7 is a schematic diagram of the anti-distracted driving subsystem of FIG. 4 determining a location of a mobile communication device.

FIG. 7 depicts 3 transceivers 214 locating a mobile device 100. As noted above, each of transceivers 214 sends an interrogation signal. The interrogation signals cause a wireless radio of mobile device 100, e.g. NFC radio 118, to emit a response signal. Optionally, transceivers 214 and mobile device 100 may be configured so that each device sends a unique interrogation signal which causes mobile device 100 to likewise emit a unique response signal. The response signal may be emitted at a standard strength and received by each transmitted at a lower strength. The strength of the response signal at a given transceiver 214 is proportional to the distance between the transceiver 214 and the mobile device 100.

As shown in FIG. 7, each signal strength is associated with a corresponding distance $r_1$, $r_2$, $r_3$ from the respective transceiver 214. Accordingly, based on the received signals, it can be determined that mobile device is located at a distance $r_1$ from transceiver 214-1; and at a distance $r_2$ from transceiver 214-2; and at a distance $r_3$ from transceiver 214-3. Thus, each received signal is associated with a spherical region of possible locations of mobile device 100.

Each of transceivers 214 sends a signal to controller 212 indicative of the respective received signal strength (and thus, of the respective radius $r_1$, $r_2$, $r_3$). Controller 212 may be programmed with locations of transceivers 214 within vehicle 300.

Controller 212 determines a region $r_0$ corresponding to the mutual interaction of a sphere of radius $r_1$ centered on transceiver 214-1; a sphere of radius $r_2$ centered on transceiver 214-2; and a sphere of radius $r_3$ centered on transceiver 214-3. Mobile device 100 may be known to be located within region $r_0$. Since controller 212 is programmed with the locations of transceivers 214 within vehicle 300, region $r_0$ may be translated to a location within the vehicle, namely, a location relative to the driver's seat.

Though FIG. 7 depicts three transceivers 214, more transceivers 214 may be used, and a larger number of transceivers 214 may allow region $r_0$ to be determined more accurately.

Figure 8:
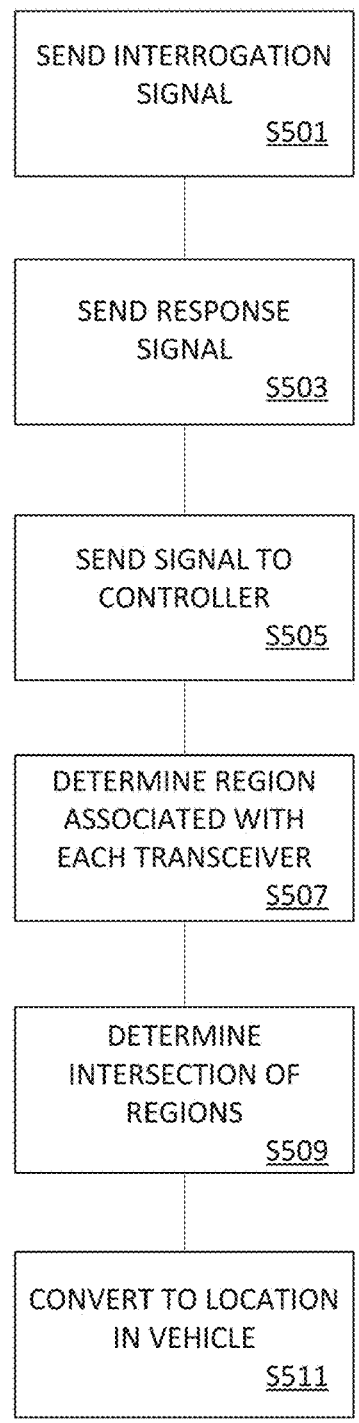
FIG. 8 is a flow chart showing a method of locating a mobile communication device.

FIG. 8 depicts a method of determining the location of device 100 by transceivers 214 and controller 212. At block S501, each transceiver 214 emits an interrogation signal. At block S503, mobile device 100 emits a response signal. At block S505, each transceiver sends a signal to controller 212 indicative of the strength of the received response signal and thus, the distance between mobile device 100 and the respective transceiver 214. At block S507, controller 212 determines a region associated with each response signal strength. At block S509, controller 212 determines a region of intersection of the regions. At block S511, controller 212 translates the region of intersection to a location within the vehicle 300.

Anti-distraction controller 212 further receives signals from one or more of engine controller 202, transmission controller 204, accessories 206 and sensors 208 indicative of the state of vehicle 300, namely, whether vehicle 300 is in motion.

If a mobile device 100 is located within vehicle 300 at a location proximate the driver's seat while vehicle 300 is in motion, anti-distraction controller 212 is configured to send a signal to the mobile device 100 causing functions of the mobile device to be disabled.

Figure 6:
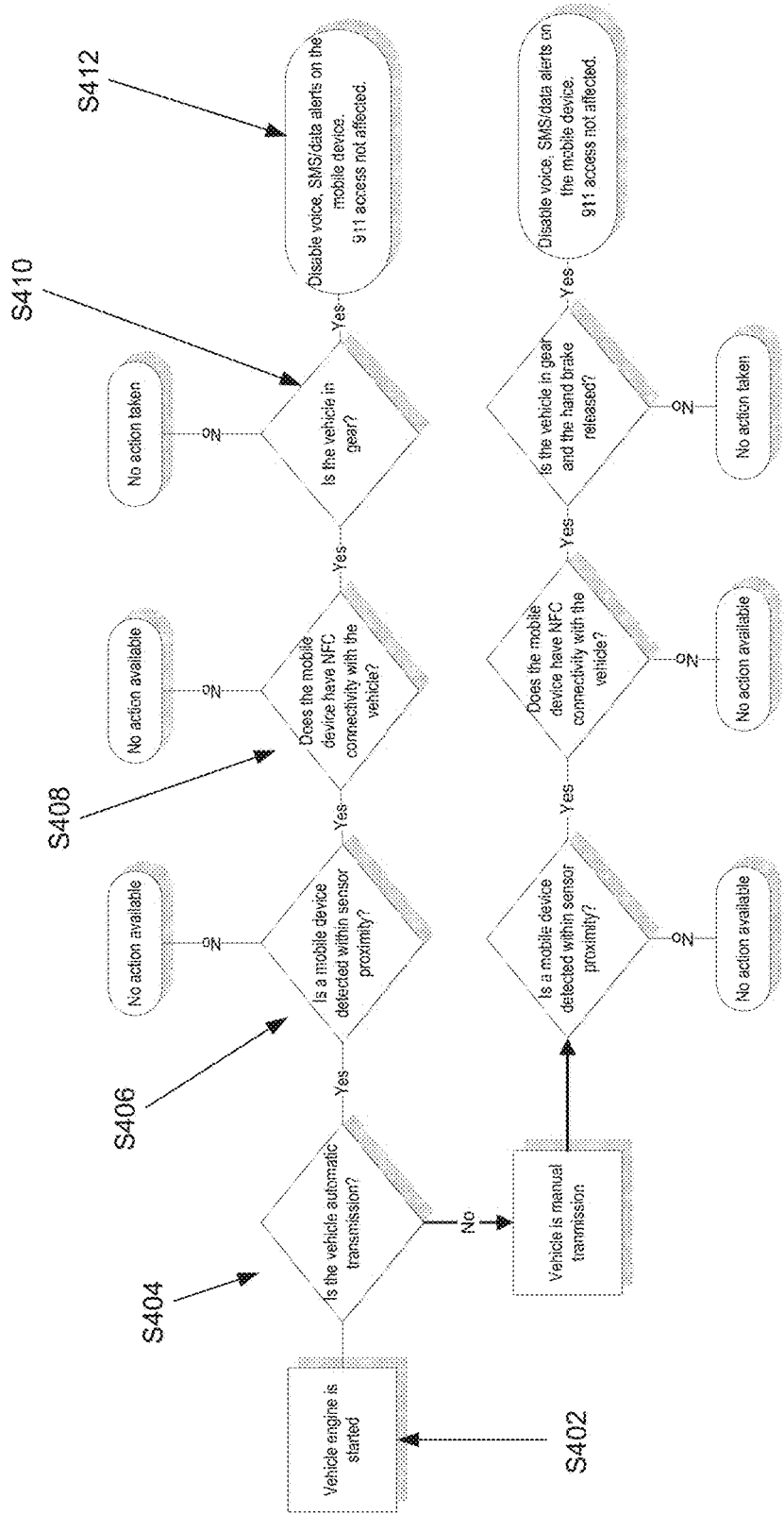
FIG. 6 is a flow diagram depicting a control process of the anti-distracted driving subsystem of FIG. 4.

FIG. 6 depicts a flow chart of a process S400 of operation of anti-distraction subsystem 210. While anti-distraction subsystem 210 is active, transceivers 214 periodically send interrogation signals to determine the presence of mobile device 100.

At block S402, the engine of vehicle 300 is started, activating anti-distraction subsystem 210.

At block S404, anti-distraction controller 212 determines if the transmission of vehicle 300 is automatic or manual based on a signal from transmission controller.

At block S406, anti-distraction controller 212 determines, based on signals received from transceivers 214, whether a mobile device 100 is present and the approximate location of the mobile device within vehicle 300.

If mobile device 100 is determined to be within a specific threshold proximity to the drivers seat at block S408, anti-distraction controller 212 determines, based on signals received from transceivers 214, whether transceivers 214 have connectivity with mobile device 100. The threshold may correspond approximately to the reach of a driver seated in the driver's seat. This may prevent a driver from defeating the system by simply holding a mobile device 100 outside the proximity threshold. In an example, the proximity threshold may be about 50 cm.

At block S410, if anti-distraction subsystem 210 has connectivity with mobile device 100, anti-distraction controller 212 determines, based on a signal from transmission controller 204, whether vehicle 300 is in gear. Anti-distraction controller 212 may also determine, for example, if the transmission is manual, based on a signal from an appropriate sensor 208, the speed of vehicle 300 or whether a parking or auxiliary brake of vehicle 300 is fully engaged.

At block S412, if mobile device 100 is in proximity to the drivers seat, anti-distraction subsystem 200 has connectivity with mobile device 100 and vehicle 300 is in gear, without the parking brake engaged, or travelling above a speed threshold, e.g. 10 km/h anti-distraction subsystem 210 may send a signal to mobile device 100 causing mobile device 100 to enter a driving mode In the driving mode, mobile device 100 may partially or fully disable one or more of its radios. For example, cellular radio 112 may be placed into a mode in which sending and receiving of data or text transmissions is inhibited. Alternatively, cellular radio 112 may be fully disabled.

In addition, in the driving mode, mobile device 100 may inhibit launching of specific applications such as web browsers, media players, social media applications, email and messaging applications.

Figure 9:
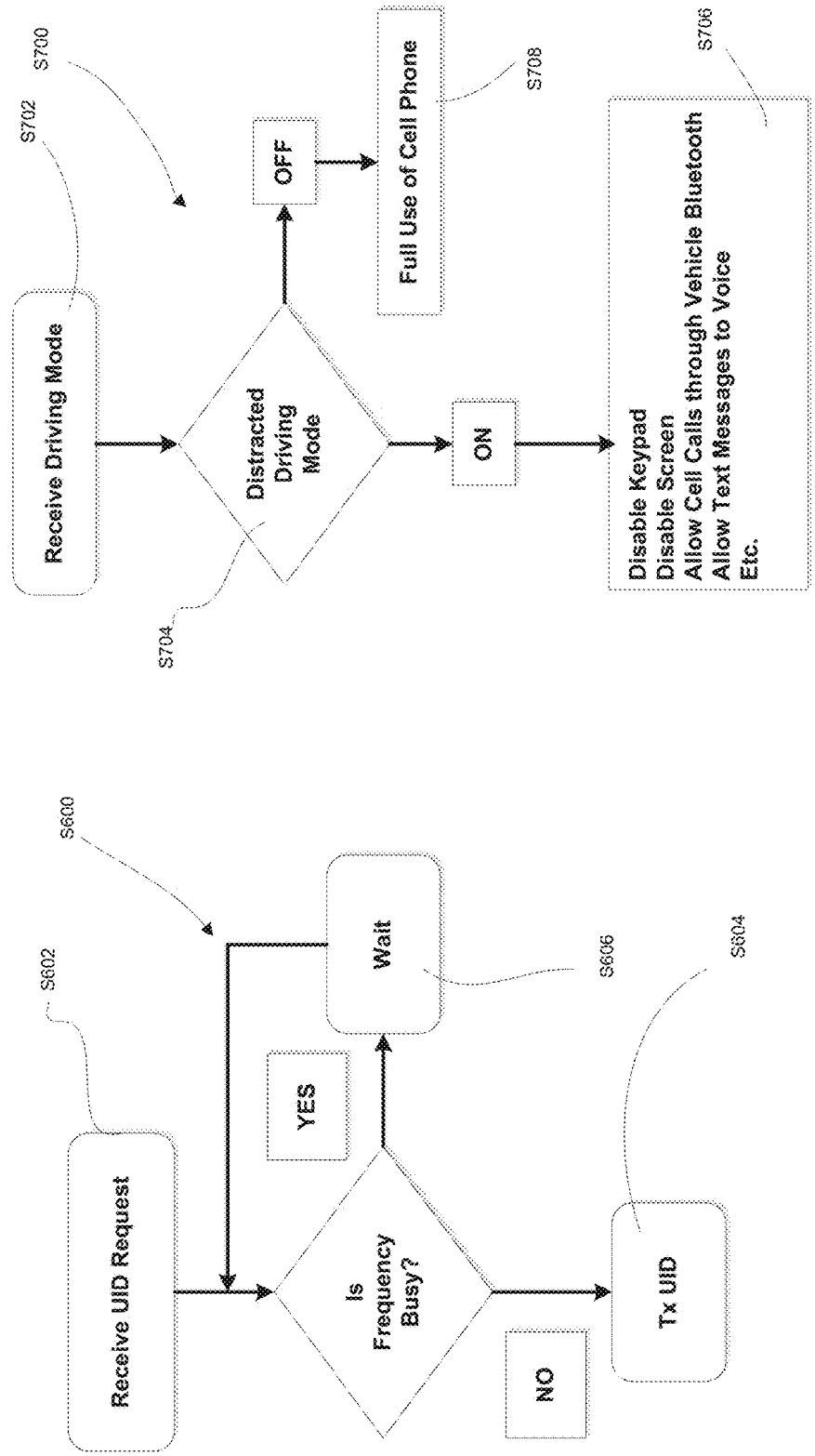
FIGS. 9A-9B are flow charts showing methods performed at a mobile communication device.

FIGS. 9A-9B depict example processes S600, S700 carried out at mobile devices 100. The processes S600, S700 may be carried out, for example, by processors and radios of mobile devices 100 under control of software stored on and executed by the mobile devices 100.

Referring to FIG. 9A, at block S602, a mobile device 100 may receive a request for a unique identifier (UID) of the mobile device. Such request may, for example, be received from a transceiver 214. The request may be transmitted and received by wireless transmission at a particular frequency. In response to receipt of the UID request, the mobile device 100 may send a response including a UID of the mobile device 100. The response may be sent using a radio of the mobile device 100. In an example, the response may be sent by the same method as the UID request (e.g. NFC, bluetooth, etc.). If the relevant radio and transmission frequency of the mobile device 100 is not busy, the mobile device 100 transmits the response at block S604. Alternatively, if the radio or transmission frequency is busy, the mobile device waits, at block S606, until the radio and frequency are free.

The process S600 may run in a loop at mobile device 100. Alternatively, process S600 may be performed using a service, application or the like at mobile device 100. Mobile device 100 may be configured to invoke the service, application or the like upone receipt of a UID request.

Referring to FIG. 9B, at block S702, mobile device 100 receives a message indicative of a selected mode. The mode message may be sent by a transceiver 214, for example, by NFC, bluetooth or the like, and received by mobile device 100 over a corresponding radio.

At block S704, mobile device 100 parses the received driving mode message and determines the selected mode. For example, the message may indicate a restricted or anti-distraction mode, or a full use mode. The former may be sent to a driver's mobile device 100 during driving.

If the mode message indicates the anti-distraction mode, process S700 moves to block S706, at which functions, applications, features or the like are disabled at mobile device 100. For example, keypad or text input may be disabled; a screen may be disabled, calls may be disabled unless sent or received by way of a connected hands-free device such as a headset. Alternatively or additionally, certain applications may be prevented from opening.

If the mode message indicates the full use mode, process S700 moves to block S708, at which mobile device 100 is permitted to operate without restriction.

The process S700 may run in a loop at mobile device 100. Alternatively, process S700 may be performed using a service, application or the like at mobile device 100. Mobile device 100 may be configured to invoke the service, application or the like upon receipt of a UID request.

Figure 10:
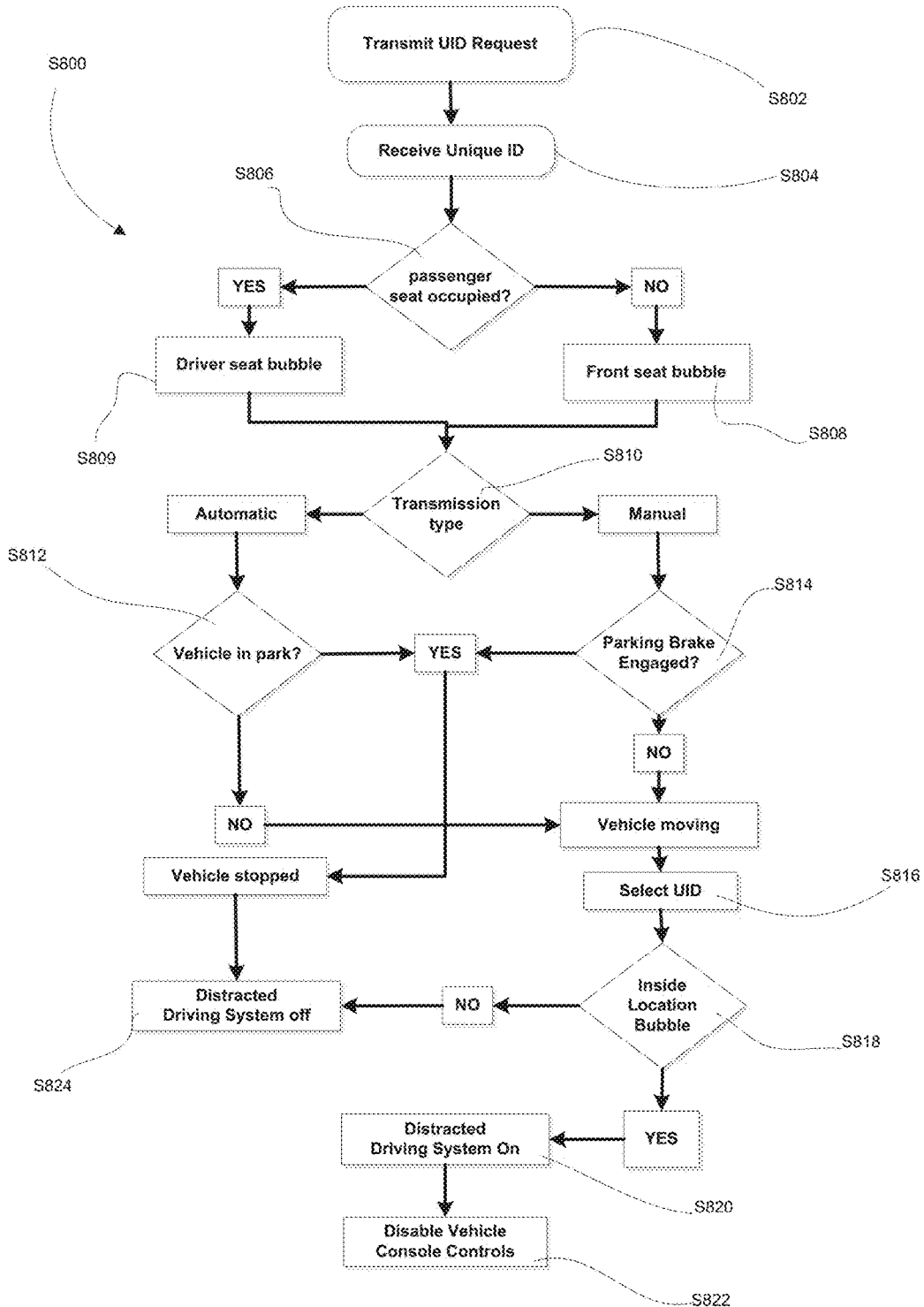
FIG. 10 is a flow chart showing a method performed by an anti-distracted driving subsystem.

Referring to FIG. 10, an example process S800 carried out by anti-distraction subsystem 210 is depicted.

At block S802, a UID request is transmitted to a mobile device 100 using a transceiver 214. The UID request may be sent, for example, using NFC, bluetooth, or the like, and may include instructions for causing the mobile device 100 to respond with a message including a UID. The request may be sent to a specific mobile device 100, causing a response from that mobile device 100, or it may be broadcast to all mobile devices 100 in range, causing each mobile device 100 to respond. In some embodiments, multiple UID requests may be transmitted, directed to multiple mobile devices 100. In some embodiments, transmission of UID requests may be periodically repeated.

At block S804, a message is received at a transceiver 214 including a UID of a mobile device 100. Anti-distraction subsystem 210 may store the received UID. Multiple UIDs may be received and stored contemporaneously, for example, if a UID request was broadcast at block S802 and multiple mobile devices 100 are present.

At block S806, anti-distraction subsystem 210 determines if a passenger is present in the vehicle's front passenger seat. Anti-distraction subsystem 210 may, for example, read a signal from a passenger airbag sensor indicative of at least a threshold weight being detected on the passenger seat.

If no passenger is present in the passenger seat, anti-distraction subsystem 210 may, at block S808, define a region of interest (hereinafter referred to as a "bubble") corresponding approximately to the front (driver's) row of seating in the vehicle. Any mobile device 100 located within the bubble may be placed in an anti-distraction mode while the vehicle is in motion.

If a passenger is present in the passenger seat, anti-distraction subsystem 210 may, at block S809, define a bubble corresponding approximately to the driver's seat of the vehicle. This may avoid a mobile device 100 of a passenger being placed in anti-distraction mode.

At block S810, anti-distraction subsystem 210 may determine a transmission type of the vehicle. As will be apparent, vehicles equipped with automatic transmissions typically have a "park" setting. In contrast, vehicles with manual transmissions typically do not have such a transmission setting. However, vehicles with manual transmissions may be immobilized by activation of a parking brake.

Thus, if the vehicle has an automatic transmission, at block S812, anti-distraction subsystem determines if the vehicle is in "park". This may be determined based on a signal from transmission controller 204. Conversely, if the vehicle has a manual transmission, at block S814, anti-distraction controller 210 may determine if the vehicle's parking brake is engaged. This may be determined, for example, based on a signal from a sensor on the parking brake or on the parking brake actuator (e.g. hand lever or foot pedal).

If the vehicle is in park or has its parking brake activated, anti-distraction subsystem 210 may determine that the vehicle is not in motion. Accordingly, at block S824 anti distraction subsystem 210 permits any mobile devices 100 to operate normally.

On the other hand, if the vehicle is not in park and the parking brake not engaged, anti-distraction subsystem 210 determines that the vehicle is in motion, in which case it may be desired to place one or more mobile devices 100 in anti-distraction mode.

At block S816, anti-distraction subsystem selects a UID received at block S804. At block S818, anti-distraction subsystem determines the location of the mobile device in accordance with the process described above and depicted in FIG. 8.

If the location of the mobile device 100 is outside the bubble identified at block S808 or S809, at block S824, anti distraction subsystem 210 permits any mobile devices 100 to operate normally.

If the location of the mobile device 100 is within the bubble associated with S808 and S809, at block S820, anti-distraction subsystem 210 sends a message to the mobile device 100 causing the device to enter a driving mode. The message may be sent by a transceiver 214, for example, using NFC, bluetooth or the like. As described above, the message may cause features or applications of mobile device to be disabled.

At block S822, anti-distraction subsystem may also cause features of the vehicle console or dashboard to be inhibited. For example, navigation systems may be disabled to prevent entry of text by a driver.

If anti-distraction subsystem 210 received any additional UIDs at block S804, the process loops through all of the received UIDs. That is, for each UID, the process returns to block 204 and proceeds through the remainder of process S800 and activates a driving mode for any UIDs located within the bubble. In some embodiments, more than one mobile device 100 may be located within the bubble and therefore, more than one device may be placed in driving mode.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

The following discussion provides many example embodiments. Although each embodiment represents a single combination of inventive elements, other examples may include all possible combinations of the disclosed elements. Thus if one embodiment comprises elements A, B, and C, and a second embodiment comprises elements B and D, other remaining combinations of A, B, C, or D, may also be used.

The term "connected" or "coupled to" may include both direct coupling (in which two elements that are coupled to each other contact each other) and indirect coupling (in which at least one additional element is located between the two elements).

The technical solution of embodiments may be at least partly in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

Although the embodiments have been described in detail, it should be understood that various changes, substitutions and alterations can be made herein without departing from the scope as defined by the appended claims.

What is claimed is:

1. An anti-distracted driving system, comprising:
a plurality of transceivers at different locations within a vehicle, each of said transceivers operable to:
receive one or more signals, each signal comprising an identifying value emitted from a corresponding mobile device in accordance with a wireless communication protocol; and
output one or more detection signals indicative of the strength of the one or more received signals;
a controller in communication with said transceivers to receive said detection signals, said controller operable to, for each identifying value:
calculate a corresponding distance of said corresponding mobile device for each of said detection signals and to determine a location of said corresponding mobile device within said vehicle based on said distances; and
in response to determining that said corresponding mobile device is less than a threshold distance from a driver's seat of said vehicle, send a signal from a transceiver to said corresponding mobile device according to said wireless communication protocol causing at least one function of said mobile device to be inhibited.

2. The system of claim 1, wherein said disabling signal inhibits a media function of said mobile device.

3. The system of claim 1, wherein said disabling signal inhibits text input to said mobile device.

4. The system of claim 1, wherein said disabling signal inhibits a short-message service (SMS) function of said mobile device.

5. The system of claim 1 wherein said controller is configured to send said disabling signal only when said vehicle is travelling above a threshold speed.

6. The system of claim 1, wherein said controller is configured to send said disabling signal only when a gear is selected in said vehicle.

7. The system of claim 1, comprising four transceivers, each proximate a corner of aa cabin of said vehicle.

8. The system of claim 1, wherein said transceivers comprise near-field communication (NFC) transceivers configured to send and receive signals to and from said mobile device according to a near-field communication protocol.

9. A mobile communication device, comprising:
a processor;
a memory storing software applications;
a wireless communication radio, said wireless communication radio operable under control of said processor to receive an interrogation signal from at least one transceiver in a vehicle, said interrogation signal requesting a unique identifying value, and said radio further operable to emit a response signal comprising a unique identifying value, and to receive a disabling signal from a controller when the controller determines that said mobile device is less than a threshold distance from a driver's seat in said vehicle;
wherein said software applications include an application operable to cause said processor, in response to receiving the disabling signal from said controller, to inhibit a function of said mobile device.

10. The mobile communication device of claim 9, wherein said function is a software application.

11. The mobile communication device of claim 9, wherein said function is a media application.

12. The mobile communication device of claim 9, wherein said function is a text communication application.

13. The mobile communication device of claim 9, wherein said function is a radio for communicating over a network.

14. The mobile communication device of claim 9, wherein said wireless communication radio comprises a near-field communication (NFC) radio.

15. The anti-distracted driving system of claim 1, wherein said controller is in communication with a sensor to receive a passenger signal indicative of the presence of an occupant in a passenger seat of said vehicle, and to reduce said threshold distance in response to said passenger signal.

16. The anti-distracted driving system of claim 1, wherein each of said transceivers is operable to broadcast a request for a unique identifying value in accordance with a communication protocol.

* * * * *